United States Patent [19]
Chapman et al.

[11] 3,907,061
[45] Sept. 23, 1975

[54] GAS-CUSHION VEHICLES

[75] Inventors: John H. Chapman, Fareham, England; Ronald Christopher Fishlock, Toronto, Canada

[73] Assignee: Hovermarine Transport Limited, Southampton, England

[22] Filed: Sept. 18, 1973

[21] Appl. No.: 398,558

[30] Foreign Application Priority Data
Sept. 18, 1972 United Kingdom............... 43129/72

[52] U.S. Cl. ................ 180/117; 180/120; 180/128; 114/67 A
[51] Int. Cl.² ........................................... B60V 1/11
[58] Field of Search ........... 180/125, 124, 126, 116, 180/117, 128; 114/67 A

[56] References Cited
UNITED STATES PATENTS

| | | | |
|---|---|---|---|
| 3,473,503 | 10/1969 | Gunther | 180/126 |
| 3,512,603 | 5/1970 | Crewe et al. | 180/124 |
| 3,536,156 | 10/1970 | Crago | 180/124 |
| 3,550,718 | 12/1970 | Knuth | 180/116 |
| 3,613,822 | 10/1971 | Mackie | 180/124 |
| 3,618,695 | 11/1971 | Wheeler | 180/124 |

FOREIGN PATENTS OR APPLICATIONS
1,109,562   4/1968   United Kingdom................ 180/116

*Primary Examiner*—Kenneth H. Betts
*Assistant Examiner*—Jack D. Rubenstein
*Attorney, Agent, or Firm*—Holman & Stern

[57] ABSTRACT

An air-cushion vehicle is provided with a flexible skirt of hollow, inflatable form, which is attached to and depends from the vehicle body so as to contain, at least in part, the vehicle-supporting cushion. Means are provided for distorting the flexible skirt so as to move it towards and away from the surface over which the vehicle travels and/or laterally relative to said surface. The skirt-distorting means may comprise dividing the interior of the skirt into separate compartments and inflating the compartments to differing pressures or may alternatively comprise disposing inflatable bags adjacent opposite sides of the flexible skirt and inflating the bags to varying pressures so as to distort the skirt. As another alternative, the skirt-distorting means may comprise hinged boards disposed adjacent the skirt and actuators for moving the boards against the skirt so as to distort it.

3 Claims, 8 Drawing Figures

GAS-CUSHION VEHICLES

BACKGROUND OF THE INVENTION

This invention relates to gas-cushion vehicles, that is to say, to vehicles for travelling over a surface and which, in operation, are supported above that surface, at least in part, by a cushion of pressurized gas, for example, air, formed and contained between the vehicle body and the surface.

The vehicle-supporting cushion may be contained, at least in part, by a flexible wall structure or skirt attached to and depending from the vehicle body.

SUMMARY OF THE INVENTION

According to the invention, a gas-cushion vehicle is provided with a flexible skirt of hollow, inflatable form attached to and depending from the vehicle body so as to contain, in operation of the vehicle and at least in part, the vehicle-supporting cushion, and means for distorting the flexible skirt so as to move it towards and away from the surface over which the vehicle travels as well as laterally relative to said surface.

The skirt-distorting means may comprise flexible wall means dividing the interior of at least part of the skirt into compartments and means for inflating the compartments to differing pressures.

Alternatively, inflatable structures may be disposed adjacent opposite sides of the skirt and means provided for the inflation of the structures whereby they distort the skirt by contact therewith.

Alternatively, rigid structures may be disposed adjacent opposite sides of the skirt and means provided for moving the rigid structures against the skirt so as to distort it.

When the flexible skirt is moved towards and away from the surface over which the vehicle travels, this results in a variation in skirt depth. When the flexible skirt is moved laterally relative to said surface, this results in a variation in the center of pressure of the vehicle-supporting cushion.

A combination of the two movements may also be obtained.

BRIEF DESCRIPTION OF THE DRAWINGS

An embodiment of the invention will now be described by way of example, with reference to the accompanying drawings, wherein.

DESCRIPTION OF THE PREFERRED EMBODIMENT

Figure 1:
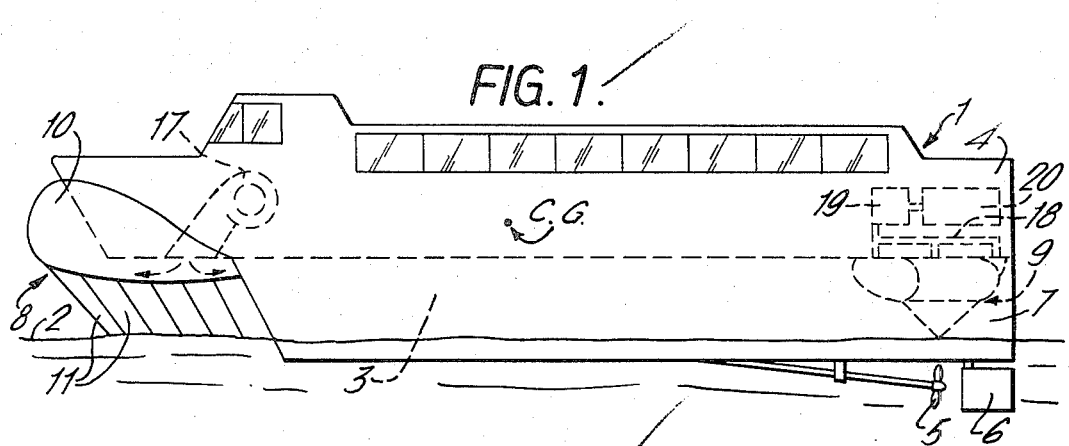
FIG. 1 is a side view of a gas-cushion vehicle.

With reference first to FIG. 1, a passenger/cargo-carrying gas-cushion vehicle 1 of the "sidewall" type is shown in operation travelling over a surface 2 of water and is supported above the surface 2 by a cushion 3 of pressurized air formed and contained between a vehicle body 4 and the surface. The vehicle 1 is propelled by a pair of water-screw propellers 5 and is steered by a pair of rudders 6.

The sides of the vehicle-supporting cushion 3 are contained by a pair of laterally-spaced rigid sidewall structures 7 extending longitudinally along the sides of the vehicle body 4 in directions substantially parallel to the fore and aft axis of the body 4. The side walls 7 depend from the sides of the vehicle body 4 so as to dip into the water and form a cushion seal. Each sidewall 7 also carries a water screw propeller 5 and a rudder 6.

The front or bow end of the cushion 3 is contained by a flexible skirt 8 and the rear or stern end therof by a flexible skirt 9. The skirts 8, 9, which are of hollow, inflatable form, and are constructed of rubberized fabric, extend laterally between (and in the case of the skirt 8, beyond as well) the front and rear ends of the sidewalls 7. The skirts 8, 9, are attached to the vehicle body 4 and depend therefrom so as to be in light contact with the water surface 2.

The front flexible skirt 8 is of two-stage form, and comprises an inflated bag 10 from which depends a succession of independently-deflectable flexible wall or skirt members 11 of the form disclosed by British Patent Specification No. 1,043,351. The rear flexible skirt 9 is also of two-stage form. The upper stage comprises an inflatable bag 15 and the lower stage pairs of interfitting inflatable flexible wall or skirt members 16 of the form disclosed by British Patent Specification No. 1,109,562.

Air forming the cushion 3 is provided by a pair of centrifugal fans 17. The air passes through the front flexible skirt 8 to inflate it before entering the space occupied by the cushion 3. The rear skirt 9 is inflated by air supplied to a duct 18 connected to an air-compressor 19 driven by a motor 20. A small amount of pressurized air can escape to the air cushion 3 from the bottom of the rear skirt 9, as indicated by the arrow 21.

Figure 2:
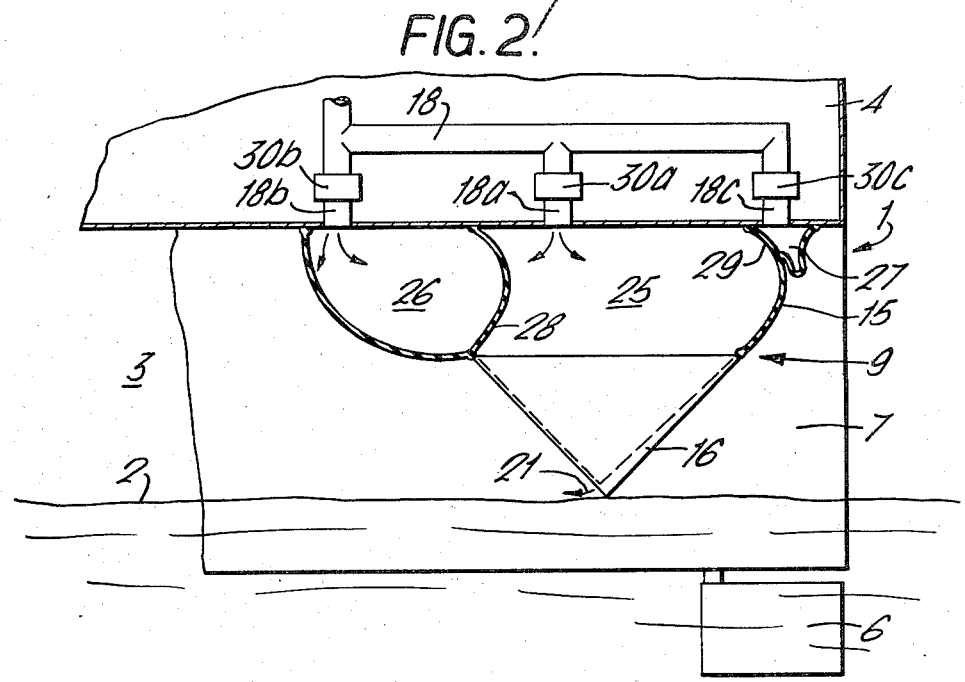
FIGS. 2 to 4 are side views, in medial section, and on an enlarged scale, of the rear flexible skirt of the gas-cushion vehicle of FIG. 1, and FIGS. 5, 6, 7 and 8 are views similar to those illustrated by FIGS. 2 to 4 and illustrate three modifications.

With reference now to FIG. 2, the rear flexible skirt 9 is provided with means for distorting the flexible skirt so as to move it towards and away from the water surface 2, as well as laterally relative to said surface. The skirt-distorting means comprise flexible wall means dividing the interior of the upper stage (i.e. inflatable bag 15) of the skirt 9 into three separate compartments as well as means for inflating the compartments to differing pressures.

The inflatable bag 15 is divided into three compartments 25, 26, 27 disposed in tandem by flexible walls 28, 29 disposed laterally. Central compartment 25 is the main compartment and fore and aft compartments 26, 27 are subsidiary compartments. The air supply duct 18 has branches 18a, 18b, 18c connected to the interiors of compartments 25, 26, 27 and electrically-operated flow/vent control valves 30a, 30b, 30c are fitted in the branches so as to provide control of inflation pressure in the compartments. The valves are under the control (by way of electrical signal lines) of the pilot of the vehicle 1. The valves 30a, 30b, 30c, can be made to vent to atmosphere but their vents are not shown.

Normally, and as shown in FIG. 2, the valves 30a, 30b, 30c are adjusted so that compartment 25 is inflated to about 1.1 Pc (Pc = Pressure of the cushion 3), compartment 26 to about 2 Pc or more and compartment 27 vented to atmosphere.

Figure 3:
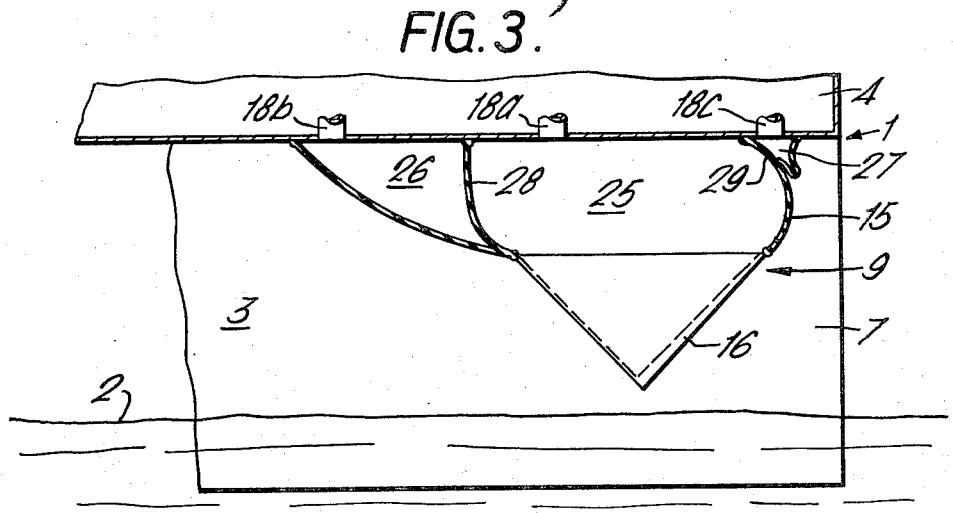

With reference to FIG. 3, to move the bottom of the flexible skirt 9 away from the water surface 2 and thus reduce the depth of the skirt, the inflation pressure of compartment 26 is reduced to about 1.1 Pc (i.e. to that of compartment 25) while compartment 27 remains vented to atmosphere. Whereas the relatively high inflation pressure in compartment 26 was holding the bottom of the skirt 9 in light contact with the water surface 2, reducing this inflation pressure to the relatively low value of 1.1 Pc allows the skirt to be lifted upwardly (and rearwardly) by pressure of the air cushion 3. Reduction in skirt depth tends to allow escape of some air from the cushion 3, which may be desirable under certain conditions. Rearward movement of the skirt 9 results in a rearward shift in the center of pressure of the cushion relative to the C.G. of the vehicle, which shift usually results in a bow-up attitude being taken by the vehicle.

Figure 4:
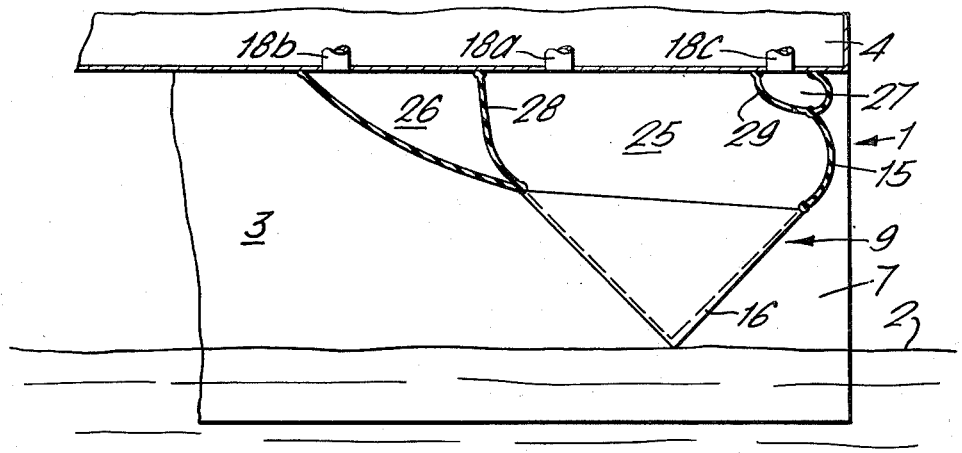

With reference to FIG. 4, the shift of cushion center of pressure can be obtained without an overall reduction in skirt depth by inflating compartment 27 to about 2 or more Pc. This tends to lead to a "tilting" of the skirt 9 so that its bottom can again be brought into light contact with the water surface 2.

Increasing inflation pressure of the compartment 26 to substantially above 2 Pc (say to 3 Pc) will cause upward and forward movement of the bottom of the rear flexible skirt 9.

The invention allows adjustment of the rear skirt 9 and center of pressure of the vehicle-supporting cushion 3 to accommodate varying operating conditions. Thus the attitude of the vehicle 1 can be adjusted to suit differing sea conditions and a non-uniform distribution of cargo and/or passengers.

Figure 5:
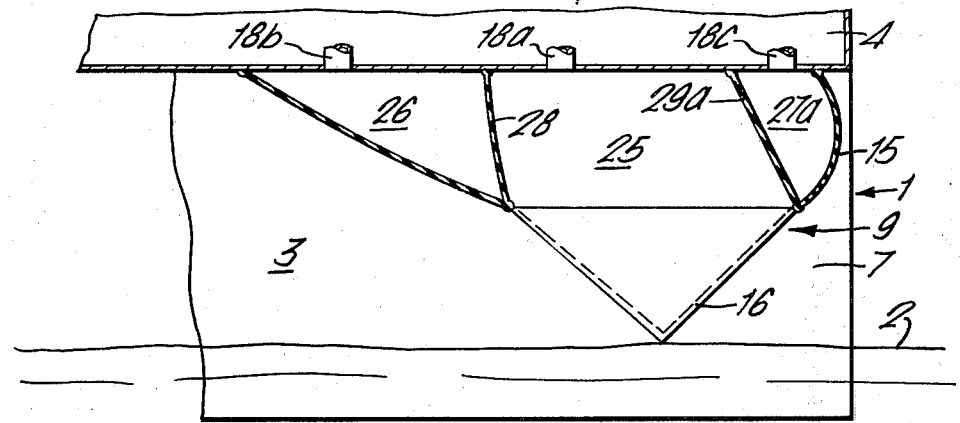
Figure 6:
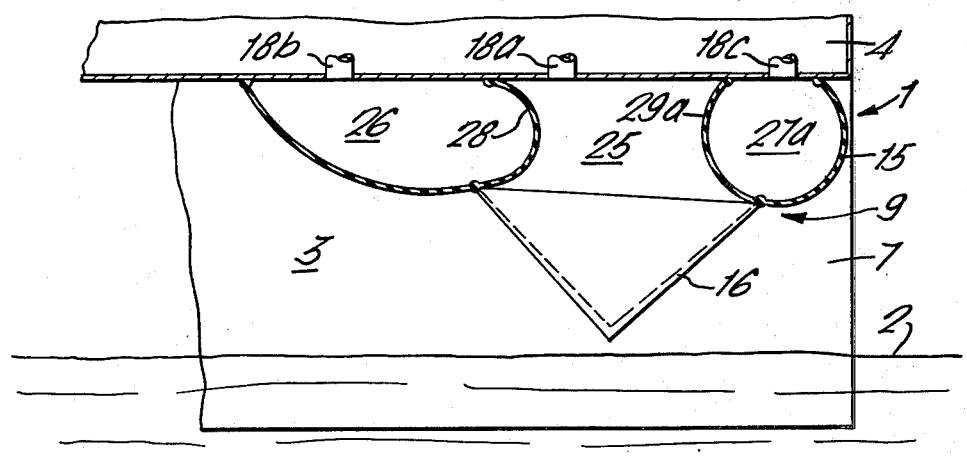

FIGS. 5 and 6 illustrate a modification wherein the flexible wall 29 is replaced by a flexible wall 29a which extends to the lower stage 16 of the flexible skirt 9 so as to define a compartment 27a of larger volume than the compartment 27 of FIGS. 2 to 4.

As shown in FIG. 5, under normal conditions, the compartments 26, 25 and 27a are all inflated to a pressure of about 1.1 Pc, so as to maintain the bottom of the skirt 9 in light contact with the water surface 2. Increasing the inflation pressures of the compartments 26 and 27a to about 1.5 Pc however, as shown in FIG. 6, results in an upward and forward movement of the bottom of the skirt. To move the bottom of the skirt 9 upwardly and rearwardly, inflation pressure in the compartment 27a only will need to be increased.

Figure 7:
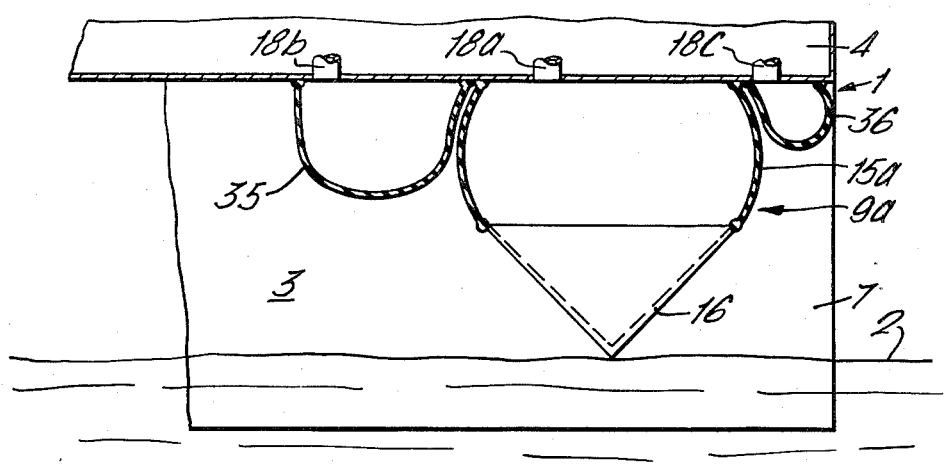

In the modification illustrated in FIG. 7, the rear flexible skirt 9a has its lower stage 16 attached to an upper bag 15a and inflatable structures in the form of separate flexible bags 35, 36 are disposed adjacent the front and rear ends of the bag 15a, i.e. at opposite sides thereof. Varying the inflation pressures of the bags 35, 36 (and, if needs be, the inflation pressure of the bag 15a also) results in distortion of the flexible skirt 9a by variable contact of the bags 35, 36 therewith.

Figure 8:
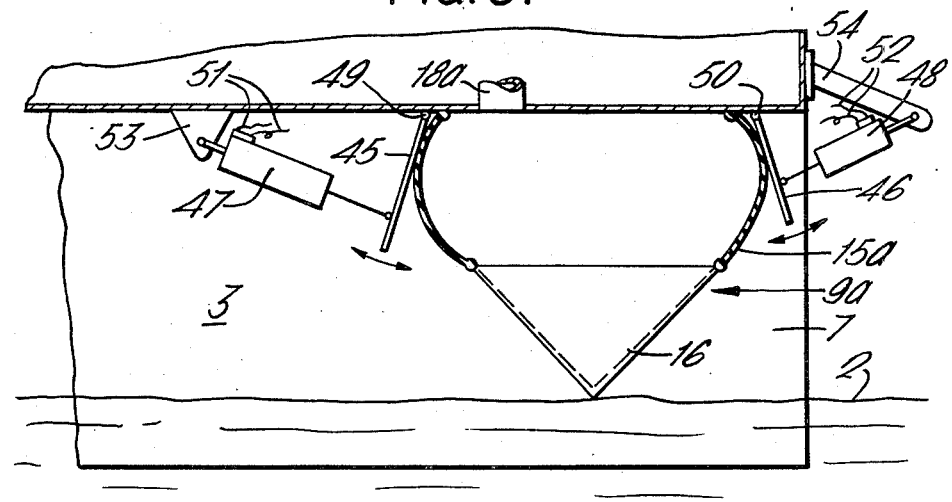

In the modification illustrated by FIG. 8, the bags 35, 36 (and their inflation ducts 18b, 18c) are replaced by hinged boards 45, 46 of rigid construction disposed adjacent the front and rear ends of the bag 15a i.e. at opposite ends thereof. Electrically-operated actuators 47, 48 are provided for moving the boards 45, 46 against the bag 15a so as to move the skirt 9a. This movement of the skirt 9a may be assisted by varying the inflation pressure of the bag 15a.

The boards 45, 46 are pivotally attached to the bottom of the vehicle body 4 by hinges 49, 50. The actuators 47, 48, which are under the control (through electrical signal lines 51, 52) of the pilot of the vehicle 1, are pivotally connected to the vehicle body 4 by way of support brackets 53, 54. It will be appreciated that the arrangement illustrated in FIG. 8 is semi-diagrammatic and that in practice it would be preferred to have the boards 45, 46 pivoted by a rather neater actuator arrangement which would also be designed and constructed so as to be less prone to damage by waves than that illustrated.

The flexible skirt of the invention is not restricted to containing the rear part of a vehicle-supporting cushion. It may contain another part of the cushion, for example, the front part thereof. Alternatively, it may be made of annular form so as to contain a vehicle-supporting cushion around the whole of its periphery.

We claim:

1. A gas-cushion vehicle provided with a flexible skirt of hollow, inflatable form having an upper and lower stage, said skirt being attached to and depending from the vehicle body so as to contain, in operation of the vehicle, and at least in part, the vehicle-supporting cushion, the upper stage comprising three inflatable compartments disposed in tandem and separated from each other by laterally-disposed flexible wall means, the lower stage comprising a plurality of flexible skirt members defining cavities open to the central compartment of the upper stage, and skirt distorting means for distorting the upper stage laterally so as to move the flexible skirt towards and away from the surface over which the vehicle travels as well as laterally relative to said surface, said skirt distorting means comprising means for inflating the three compartments of the upper stage to differing pressures.

2. The vehicle as claimed in claim 1, wherein the sides of the vehicle-supporting cushion are contained by a pair of laterally-disposed wall structures extending longitudinally along the sides of the vehicle body in directions substantially parallel to the fore and aft axis of the body and wherein the flexible skirt extends laterally between adjacent ends of the walls so as to contain cushion gas.

3. The vehicle as claimed in claim 1, wherein the means for inflating the three compartments to differing pressures comprises compressor means, a supply duct connected to the outlet of the compressor, three branch ducts connecting each of the three compartments to the supply duct and valve means for controlling flow through each of the branch ducts.

* * * * *